Figure 1A:
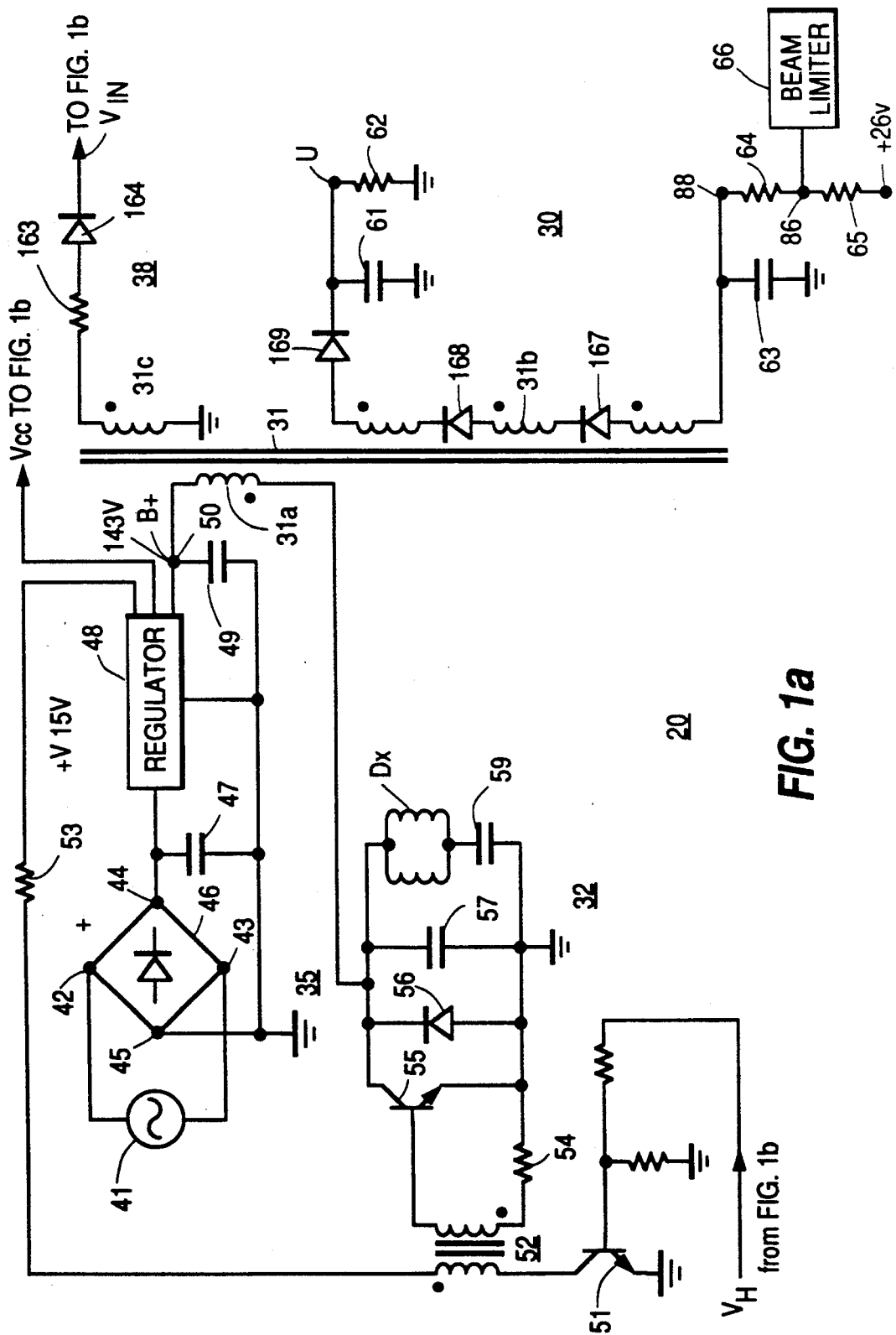

United States Patent [19]

Wilber

[11] Patent Number: 5,111,122
[45] Date of Patent: May 5, 1992

[54] VIDEO DISPLAY HIGH VOLTAGE PROTECTION CIRCUIT

[75] Inventor: James A. Wilber, Indianapolis, Ind.

[73] Assignee: Thomson Consumer Electronics, Inc., Indianapolis, Ind.

[21] Appl. No.: 695,160

[22] Filed: May 3, 1991

[51] Int. Cl.$^5$ .......................................... H01J 29/70
[52] U.S. Cl. .................................. 315/411; 358/190; 358/243
[58] Field of Search ................. 315/411; 358/190, 243

[56] References Cited

U.S. PATENT DOCUMENTS 4,335,335  6/1982  Willis .
4,389,676  6/1983  Balaban et al. ..................... 315/411
4,562,508  12/1985  Chen et al. .

OTHER PUBLICATIONS

A Service Manual for Goldstar Chassis NC-95A, Models CMT-4842N & CMT-9842X, dated Jul. 1989, front & back pages & Pg. of FIG. 8.
A Service Manual RCA/GE Color TV Basic Service data for CTC169 (DV) chassis, dtd. 1990, cover pg., pp. 1-22 & pp. 2-4.

Primary Examiner—Theodore M. Blum
Attorney, Agent, or Firm—Joseph S. Tripoli; Joseph J. Laks; Sammy S. Henig

[57] ABSTRACT

A television receiver high voltage generator includes a high voltage transformer for developing an ultor accelerating potential at an ultor output terminal. A flyback voltage produced in a winding of the transformer is rectified to produce an ultor accelerating potential representative DC voltage. A high voltage protection circuit comprises a comparator/amplifier stage that level shifts the ultor accelerating potential representative DC voltage and applies the level shifted voltage across a base-emitter junction of a first transistor. The first transistor is coupled to a second transistor to form a latch. When, as a result of excessive ultor accelerating potential, the latch becomes active, the generation of the ultor accelerating potential is disabled. The first and second transistors are interior to an integrated circuit; whereas, the comparator/amplifier stage is exterior to the integrated circuit.

10 Claims, 2 Drawing Sheets

VIDEO DISPLAY HIGH VOLTAGE PROTECTION CIRCUIT

This invention relates to high voltage protection circuits for a television display system.

In a typical television display system, a high voltage ultor accelerating potential is applied to the final anode electrode of a picture tube to accelerate an electron beam generated at a picture tube cathode onto a phosphor screen.

To ensure that the television receiver will not be operated, under fault conditions, at excessive emission levels of X-radiation, a high voltage protection circuit is incorporated in the television receiver circuitry. The generation of the ultor accelerating potential is disabled should the ultor accelerating potential approach unacceptable levels.

In one prior art high voltage generation and protection arrangement, an integrated circuit (IC) of the type TA8680, that is well known, made by Toshiba Corporation, Japan, is used for generating a horizontal rate signal for controlling a switching operation in a horizontal deflection circuit output stage of the television receiver. The output stage produce a retrace pulse voltage, developed across a flyback transformer secondary winding. The retrace pulse voltage is rectified and filtered to provide a DC voltage representative of the ultor accelerating potential. The ultor accelerating potential representative rectified DC voltage is coupled to a series arrangement of a zener diode and a sampling resistor. A level shifted DC voltage developed across the sampling resistor is coupled to an X-ray protection input terminal of IC TA8680 to control a latch included in IC TA8680.

When the ultor accelerating potential is within a normal operation range, the latch is inactive. On the other hand, when, as a result of excessive ultor accelerating potential, the voltage at the X-ray protection input terminal is greater than a threshold voltage, having a nominal value of +1.1 volts, the latch becomes active. When the latch is active, the latch produces a disabling signal that disables the generation of the horizontal rate signal; thereby, the generation of the ultor accelerating potential ceases. In this way, X-ray protection is provided.

To provide high brightness in a picture tube of a television receiver, the nominal level of the ultor accelerating potential that is utilized is adjusted to be close to a maximum, safe level of the ultor accelerating potential. As a result of tolerances, a voltage developed at the X-ray protection input terminal is, for example, +1 volt, during normal operation. Disadvantageously, because the +1 volt level is close to the aforementioned threshold level of 1.1 volts, such that a difference between such levels is 0.1 volts, any relatively small noise signal that may be developed, for example, at a common or ground terminal of IC TA8680 could undesirably trigger latching or active mode operation in the latch. It may be desirable to reduce the sensitivity of the X-ray protection circuit to such noise signal so as to increase the noise margin.

In accordance with an aspect of the invention, an amplifier stage is interposed in a signal path between the ultor accelerating potential representative DC voltage and the X-ray protection input terminal of a latch such as utilized e.g. in the IC TA8680. The amplifier stage reduces the attenuation in the signal path. Therefore, in the entire tolerance range, the difference between the level at the input terminal of IC TA8680 and the threshold level of 1.1 volts is substantially greater than the aforementioned 0.1 volts. It follows that the sensitivity to noise signal is reduced.

A high voltage generation circuit of a video display apparatus with high voltage protection, embodying an aspect of the invention, includes a latch having an input, responsive to a control signal developed at the input of the latch, for triggering the latch when the control signal exceeds a threshold level of the latch to generate a latched, disabling signal when the latch is triggered. An ultor accelerating potential is developed at an output terminal. The development of the ultor accelerating potential is disabled in accordance with the disabling signal. An ultor signal representative of the ultor accelerating potential is developed. An amplifier having an input responsive to the ultor signal generates the control signal. The control signal is at a level that exceeds the threshold level when the ultor accelerating potential is excessive, and at a level that is substantially smaller than the threshold level by an amount that is determined by a gain of the amplifier when the ultor accelerating potential is within a tolerance range.

Figure 1B:
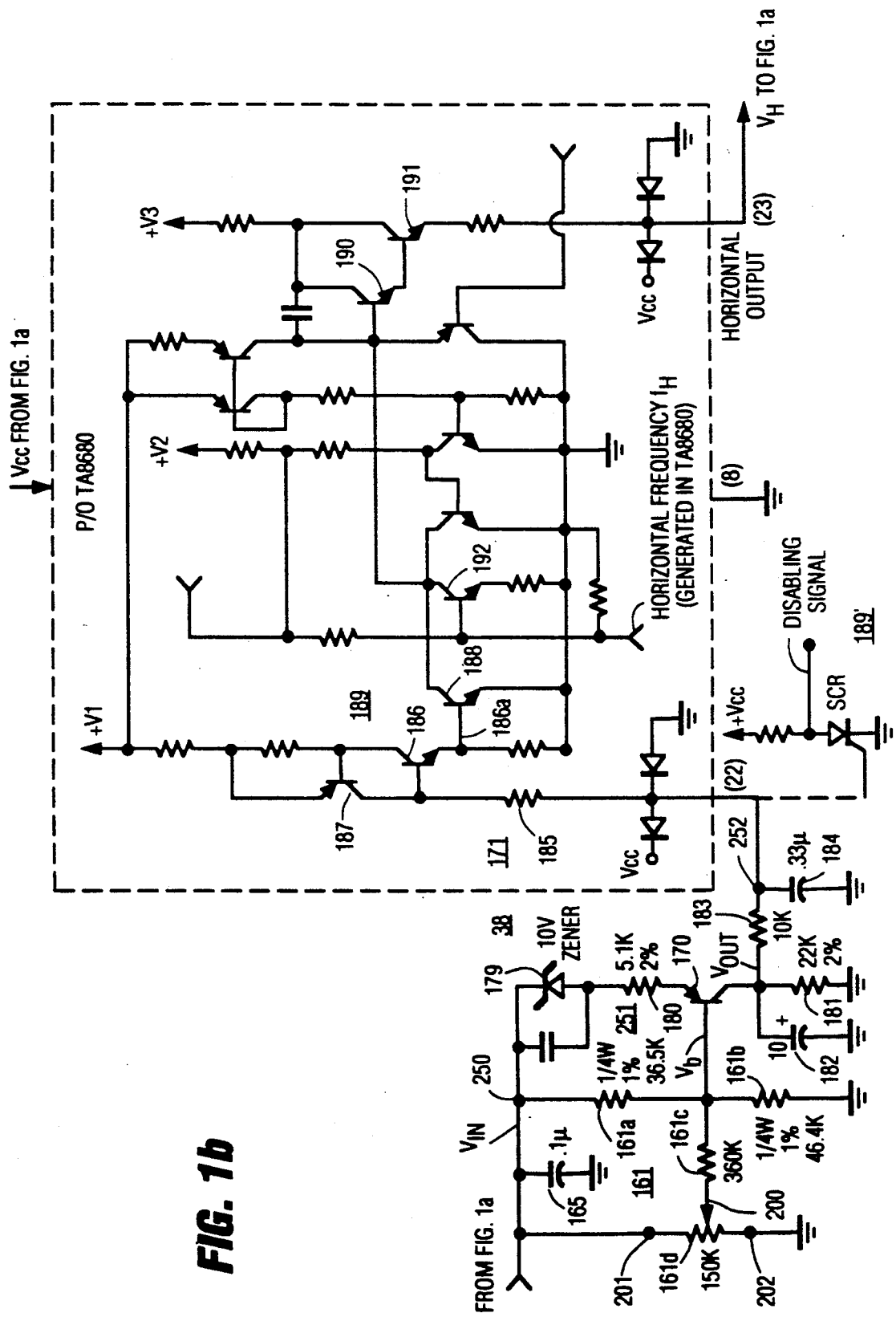

FIGS. 1a and 1b illustrate a high voltage protection circuit, embodying an aspect of the invention.

FIGS. 1a and 1b illustrate a portion of television display system 20, partially in electrical schematic form, including a detailed embodiment of high voltage protection circuit 38. In FIG. 1a, a source of alternating current mains supply voltage 41 is applied to terminals 42 and 43 of a full-wave bridge rectifier 46. Coupled across terminals 44 and 45 of bridge rectifier 46 is a filter capacitor 47. An unregulated DC supply voltage is developed at terminal 44 and applied to a voltage regulator 48. Voltage regulator 48 develops a regulated B+ scanning voltage of, illustratively, +143 volts DC, at a terminal 50 and other low voltage supply voltages.

The B+ scanning voltage is applied to a horizontal output stage 35 of a horizontal deflection generator 32 through the primary winding 31a of a horizontal or flyback transformer 31. Horizontal output stage 35 includes a horizontal driver transistor 51, a driver transformer 52, a horizontal output transistor 55, a damper diode 56, a retrace capacitor 57, and an S-shaping or trace capacitor 59 that is series coupled with a horizontal deflection winding $D_x$ across horizontal output transistor 55 and damper diode 56.

IC TA8680 of FIG. 1b includes a horizontal oscillator synchronized by an automatic frequency and phase control circuit, in a manner not shown, that provides a horizontal deflection rate square-wave voltage $V_H$. Voltage $V_H$ is coupled to the base of driver transistor 51. Driver transistor 51 amplifies and inverts the square-wave voltage and applies it to the primary winding of driver transformer 52. Collector supply voltage for driver transistor 51 is obtained from a +15 voltage source that is included in regulator 48 through a resistor 53. A current limiting resistor 54 is series coupled with the base-emitter junction of transistor 55 across the secondary winding of driver transformer 52. The amplified and inverted horizontal deflection rate square-wave voltage is applied by driver transformer 52 to turn on transistor 55 during the trace interval and to turn off transistor 55 to initiate the horizontal retrace interval.

A high voltage generator 30 comprises a high voltage winding 31b of flyback transformer 31, diodes 167–169, an ultor terminal U and an ultor filter capacitor 61. The ultor load is represented schematically in FIG. 1a as an impedance 62. Filter capacitor 61 may be replaced by the distributed capacitance of the picture tube conductive coatings, not shown, if this capacitance is sufficiently large to filter out the undesirable ripple voltage components that may be developed at ultor terminal U.

The retrace pulse voltage developed across horizontal deflection winding $D_x$ is applied to flyback transformer primary winding 31a to develop retrace pulse voltages in high voltage winding 31b and a flyback transformer secondary winding 31c. A DC high voltage or ultor accelerating potential is developed at terminal U from the retrace pulse voltage developed across high voltage winding 31b when rectified by diodes 167-169 and filtered by capacitor 61.

The DC path for ultor beam current flowing from ultor terminal U to ultor load 62 is through high voltage winding 31b, originating at a +26 voltage DC supply terminal. The +26 voltage DC supply terminal is coupled to the bottom of high voltage winding 31b at a terminal 88 through resistors 64 and 65. A conventional beam limiter circuit 66 is coupled to the junction of resistors 64 and 65 at a terminal 86.

A high voltage protection circuit 38, embodying an aspect of the invention, disables normal ultor voltage generation under fault conditions such as during the generation of excessive high voltage. Protection circuit 38 includes flyback transformer secondary winding 31c, a rectifier diode 164, a voltage divider arrangement 161, a comparator/amplifier stage 251, embodying an inventive feature, that includes a transistor 170 and a latching disabling arrangement 171. Arrangement 171 is included entirely in IC TA8680. IC TA8680 is energized from a supply voltage $V_{cc}$ produced by regulator 48.

The retrace pulse voltage developed across winding 31c is applied to the anode of diode 164 through a resistor 163. The retrace pulse voltage is rectified by diode 164 and filtered by a capacitor 165 to produce a DC voltage $V_{IN}$ representative of retrace pulse amplitude and thus of the ultor accelerating potential.

Ultor accelerating potential representative voltage $V_{IN}$ is applied through voltage divider arrangement 161 to the input base electrode of transistor 170 to form a base voltage $V_b$. Arrangement 161 includes resistors 161a and 161b, coupled in series between a terminal 250 where voltage $V_{IN}$ is developed and ground. A potentiometer 161a is also coupled between terminal 250 where voltage $V_{IN}$ is developed and ground. A manually adjustable wiper 200 of potentiometer 200 is coupled via a fixed resistor 161c to the base of transistor 170. A junction terminal between resistors 161a and 161b is also coupled to the base of transistor 170. Wiper 200 is adjusted for establishing the maximum, safe level of ultor voltage U, above which further generation of ultor voltage U is disabled.

When the position of wiper 200 is at one extreme end, close to an end terminal 201 of potentiometer 161d, voltage $V_b$ is at a maximum and the difference between voltages $V_{IN}$ and $V_b$ is at a minimum. On the other hand, when the position of wiper 200 is at the other extreme end, close to the an end terminal 202 of potentiometer 161d, voltage $V_b$ is at a minimum and the difference between voltages $V_{IN}$ and $V_b$ is at a maximum. Thus, when wiper 200 is at each of the extreme ends, voltage $V_b$ is, advantageously, determined by the values of fixed resistors 161a, 161b and 161c that can be, each, a low tolerance resistor. Advantageously, a change in the position of wiper 200 produces a substantially linear change in voltage $V_b$ in the entire position range of wiper 200.

Voltage $V_{IN}$ of FIG. 1b is also applied through a zener diode 179, that provides a reference voltage of 10 volts, coupled in series with an emitter resistor 180, to the emitter electrode of transistor 170 of comparator/amplifier stage 251. A collector load resistor 181, in parallel with a filter capacitor 182, is coupled to the collector electrode of transistor 170. A ratio between resistors 181 and 180 establish a voltage amplification gain of stage 251 for amplifying a voltage difference between voltage $V_{IN}$ and base voltage $V_b$ developed at the base electrode of transistor 170.

Amplified and level shifted output voltage $V_{OUT}$ of comparator/amplifier stage 251, embodying an inventive feature, is coupled via a noise reducing low pass filter that includes a resistor 183 and a capacitor 186 to an input terminal 252 of IC TA8680. Input terminal 252, pin No. 22, is coupled via a resistor 185 to a base electrode of a transistor 186, that is interior to IC TA8680, of latching disabling arrangement 171. A transistor 187 that is of opposite conductivity type with respect to transistor 186 has a collector electrode coupled to the base of transistor 186. The base of transistor 187 is coupled to the collector of transistor 186, thereby providing a positive feedback in a manner that bypasses amplifier stage 251. Thus, transistors 187 and 186 form a regenerative latch arrangement 189. The emitter electrode of transistor 186 is coupled to the base of a disabling transistor 188 of arrangement 171 for generating a disabling signal 186a at the emitter of transistor 186.

When ultor voltage U is smaller than, or equal to the nominal high voltage operating condition, the difference between voltages $V_{IN}$ and $V_b$ is smaller than the sum of the breakdown voltage of zener diode 179, that is approximately 10 volts, and the forward, base-emitter voltage of transistor 170. Therefore, collector voltage $V_{OUT}$ is zero. An increase in voltage $V_{IN}$, that is indicative of an increase in ultor voltage U, will cause the difference between voltages $V_{IN}$ and $V_b$ to increase. Consequently, when voltage $V_{IN}$ exceeds a first threshold level such as +25 volts, that is indicative of ultor voltage U being at, for example, 31 KV volts, zener diode 179 begins conducting and voltage $V_{OUT}$ becomes positive.

In accordance with an aspect of the invention, transistor 170 of stage 251, in addition to operating as an amplifier, operates also as a comparator having a threshold voltage that is determined by zener diode 179. Advantageously, because zener diode 179 is coupled in an emitter current path of transistor 170, there is no need for an additional voltage source or current to produce zener action in a zener diode 179.

As long as voltage $V_{OUT}$ is smaller than a second threshold that is approximately +1.1 volts, latch arrangement 189 is inactive. On the other hand, when voltage $V_{OUT}$ exceeds the threshold of 1.1 volts, that is indicative of a fault condition in which excessive ultor voltage is produced, latch arrangement 189 becomes active. When latch arrangement 189 is active, a collector current in transistor 187 that is coupled to the base of transistor 186 in a regenerative positive feedback manner maintains latch arrangement 189 in the active state to maintain transistor 186, 187 and 188 conductive indefinitely until, for example, the user turns off power.

The collector of disabling transistor 188 is coupled to the base of a transistor 190 that is coupled in a Darlington configuration to a transistor 191. A signal at the horizontal frequency $f_H$ produced internally to IC TA8680 in a manner not shown is coupled via a switching transistor 192 also to the base of transistor 190. In normal operation, transistor 188 is turned off and enables IC TA8680 to produce horizontal output signal $V_H$ at the horizontal frequency $f_H$ of about 16 KHZ in the NTSC standard that is coupled to the base of transistor 51 for producing horizontal deflection and ultor accelerating potential U. When, under fault condition, ultor voltage U becomes excessive, latch arrangement 189 causes transistor 188 to become conductive, as indicated before, in a manner to prevent the generation of signal $V_H$. Therefore, the horizontal deflection rate switching voltage for horizontal output transistor 55 can no longer be developed and no horizontal scanning current can be generated in deflection winding $D_x$. Thus, no retrace pulse voltages are developed across the flyback transformer windings and no ultor accelerating potential is thereby generated.

A blank picture is observed on the phosphor screen of the picture tube, therby prompting the observer to turn off the television receiver. Alternatively, the receiver may be turned off under a control of a control circuit of the receiver, not shown, that may include a microprocessor. When the television receiver is turned off, voltage $V_{cc}$ is removed from a supply terminal of IC TA8680, deenergizing latch arrangement 189 and enabling the resumption of normal television receiver operation for transitory fault conditions.

When ultor voltage U is at a maximum, safe level that is nominally 31.2 KV, voltage $V_{IN}$ is 25.2 volts and voltage $V_{OUT}$ is at approximately +1.1 volts, the nominal threshold voltage of latch 189, as explained before. Consequently, latch arrangement 189 becomes active and disables further generation of ultor voltage U.

As a result of voltage amplification in stage 251, when ultor voltage U is at 30.4 KV, the maximum normal operation value within a tolerance range, voltage $V_{OUT}$ is zero. Advantageoulsy, voltage $V_{OUT}$ is smaller than if voltage amplification in stage 251 were not provided. The amplification in stage 251 produces a larger change between a level of voltage $V_{OUT}$, at zero volts, that occurs when ultor voltage U is at the 30.4 KV level, and the level of voltage $V_{OUT}$, at +1.1 volts, that occurs when the ultor accelerating potential becomes excessive, at 31.2 KV. Therefore, advantageously, the noise margin in latch arrangement 189 is large, such as 1.1 volts. The large noise margin results in reduced sensitivity of latch arrangement 189 to false triggering that could occur as a result of noise signal developed at, for example, a ground terminal, pin 8, of IC TA8680.

Instead of utilizing latch arrangement 189 that is formed by transistors 186 and 187, a latch arrangement 189' formed by a silicon controlled rectifier (SCR) may be utilized, as shown in dashed line. A current flowing in the SCR may be sensed in a conventional manner, not shown, for generating a disabling signal that is analogous to signal 186a.

What is claimed is:

1. A high voltage generation circuit of a video display apparatus with high voltage protection, comprising:
   a high voltage generator responsive to an alternating current voltage for developing an ultor accelerating potential at an output terminal of said generator;
   means coupled to said high voltage generator for developing an ultor signal representative of said ultor accelerating potential;
   an amplifier having an input responsive to said ultor signal for generating an output signal at an output of said amplifier;
   a latch having an input that is responsive to said output signal and an output that is coupled to an input of said latch in a positive feedback path for generating a latched, disabling signal when said amplifier output signal is indicative of excessive ultor accelerating potential, such that a signal path between said input and said output of said amplifier for the generation of said output signal is outside said positive feedback path; and
   means responsive to said disabling signal for disabling the development of said ultor accelerating potential.

2. A high voltage generating circuit according to claim 1 wherein said latch is interior to an integrated circuit and said amplifier is exterior to said integrated circuit.

3. A high voltage generating circuit according to claim 1 wherein said amplifier comprises a transistor and wherein said ultor accelerating potential representative signal is coupled to a main current conducting terminal of said second transistor via a zener diode.

4. A high voltage generating circuit according to claim 3 further comprising a resistor coupled in series with said zener diode.

5. A high voltage generating circuit according to claim 3 wherein said ultor signal is coupled to a control terminal of said transistor via a voltage divider.

6. A high voltage generating circuit according to claim 1 wherein said amplifier comprises a comparator responsive to a reference signal for generating said amplifier output signal when said ultor accelerating potential is within a range of values determined in accordance with said reference signal and for preventing the generation of said output signal when said ultor accelerating potential is outside said range of values.

7. A high voltage generation circuit of a video display apparatus with high voltage protection, comprising:
   a latch having an input, responsive to a control signal developed at said input of said latch, for triggering said latch when said control signal exceeds a threshold level of said latch to generate a latched, disabling signal when said latch is triggered;
   a high voltage generator responsive to an alternating current voltage for developing an ultor accelerating potential at an output terminal of said generator;
   means responsive to said disabling signal for disabling the development of said ultor accelerating potential;
   means coupled to said high voltage generator for developing an ultor signal representative of said ultor accelerating potential; and
   an amplifier having an input responsive to said ultor signal for generating said control signal, said control signal being at a level that exceeds said threshold level when said ultor accelerating potential is excessive, and at a level that is substantially smaller than said threshold level by an amount that is determined by a gain of said amplifier when said ultor accelerating potential is within a tolerance range.

8. A high voltage generating circuit according to claim 7 wherein said noise is developed at a common return terminal of said latch.

9. A high voltage generating circuit according to claim 7 wherein said latch comprises a silicon controlled rectifier.

10. A high voltage generating circuit according to claim 7 wherein said level of said control signal is substantially smaller than said threshold level by said amount in a manner to prevent a noise signal developed at said input of said latch from false triggering said latch.

* * * * *